United States Patent
Chantal et al.

(10) Patent No.: US 11,305,892 B2
(45) Date of Patent: Apr. 19, 2022

(54) UNIT FOR HANDLING AN AIRCRAFT TURBOJET ENGINE

(71) Applicant: Safran Nacelles, Gonfreville l'Orcher (FR)

(72) Inventors: Patrice Chantal, Moissy Cramayel (FR); Thierry Drieu, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 7 days.

(21) Appl. No.: 16/730,434

(22) Filed: Dec. 30, 2019

(65) Prior Publication Data

US 2020/0290754 A1  Sep. 17, 2020

Related U.S. Application Data

(63) Continuation of application No. PCT/FR2018/051540, filed on Jun. 25, 2018.

(30) Foreign Application Priority Data

Jun. 29, 2017 (FR) .................................... 1756067

(51) Int. Cl.
- *B64F 5/50* (2017.01)
- *F01D 25/28* (2006.01)
- *B66F 5/02* (2006.01)

(52) U.S. Cl.
CPC ................ *B64F 5/50* (2017.01); *B66F 5/025* (2013.01); *F01D 25/285* (2013.01)

(58) Field of Classification Search
CPC .......... B64F 5/50; B66F 5/025; F01D 25/285; F01D 25/28; Y10S 414/13; F16M 3/00

USPC ....... 414/743, 433, 728, 754, 917, 777, 782; 254/10 C; 298/11; 269/17, 287, 296, 63, 269/69; 280/103; 248/554, 558, 647; 206/319

See application file for complete search history.

(56) References Cited

U.S. PATENT DOCUMENTS

| 2,920,773 A | 1/1960 | Knabe |
| 2,921,784 A | 1/1960 | Miller |

(Continued)

FOREIGN PATENT DOCUMENTS

| FR | 2449057 | 9/1980 |
| FR | 3021954 | 12/2015 |

OTHER PUBLICATIONS

International Search Report for International Application PCT/FR2018/051540, dated Sep. 27, 2018.

*Primary Examiner* — Lawrence Averick
(74) *Attorney, Agent, or Firm* — Burris Law, PLLC

(57) ABSTRACT

A unit for handling an aircraft turbojet engine includes a frame, a front cradle and a rear cradle designed for supporting the turbojet engine, and a plurality of electric actuators. The cradles include devices for securing the turbojet engine. The plurality of electric actuators includes three electric actuators, where a first one and second one are arranged opposite each other, on either side of a longitudinal axis of the frame, connected to the front cradle and arranged for moving same in vertical translation, and where a third actuator is connected to the rear cradle and arranged for moving the same in vertical translation. The handling unit further includes a device for rotary driving of the front cradle about a longitudinal axis of the turbojet engine.

19 Claims, 4 Drawing Sheets

(56) References Cited

U.S. PATENT DOCUMENTS

| | | | |
|---|---|---|---|
| 2,940,769 A | 6/1960 | Taylor | |
| 6,485,247 B1* | 11/2002 | Groves | B66F 7/20 |
| | | | 180/125 |
| 6,619,640 B1* | 9/2003 | Ploski | B23Q 1/52 |
| | | | 269/17 |
| 8,600,611 B2* | 12/2013 | Seize | G01M 5/0033 |
| | | | 701/33.2 |
| 8,602,713 B1* | 12/2013 | Davis | B60P 1/34 |
| | | | 414/589 |
| 9,809,308 B2* | 11/2017 | Aguilar | B61B 15/00 |
| 10,221,724 B2* | 3/2019 | Murphy | F02C 7/20 |
| 10,920,621 B2* | 2/2021 | Murphy | F04D 29/522 |
| 2012/0110816 A1* | 5/2012 | Groves | B66F 7/28 |
| | | | 29/428 |
| 2012/0226409 A1* | 9/2012 | Seize | G01N 3/32 |
| | | | 701/33.2 |
| 2017/0096093 A1* | 4/2017 | Aguilar | B64F 5/50 |
| 2017/0107858 A1* | 4/2017 | Murphy | F04D 29/522 |
| 2017/0297744 A1* | 10/2017 | Drieu | B05C 13/02 |
| 2019/0153900 A1* | 5/2019 | Murphy | F02C 7/20 |

* cited by examiner

UNIT FOR HANDLING AN AIRCRAFT TURBOJET ENGINE

CROSS-REFERENCE TO RELATED APPLICATIONS

This application is a continuation of International Application No. PCT/FR2018/051540, filed on Jun. 25, 2018, which claims priority to and the benefit of FR 17/56067 filed on Jun. 29, 2017. The disclosures of the above applications are incorporated herein by reference.

FIELD

The present disclosure relates to a unit for handling an aircraft motor, such as a turbojet engine.

BACKGROUND

The statements in this section merely provide background information related to the present disclosure and may not constitute prior art.

An aircraft is driven by one or more turbojet engine(s) each housed in a nacelle.

A nacelle generally has a substantially tubular structure comprising an air inlet upstream of the turbojet engine, an intermediate assembly intended to surround a fan of the turbojet engine and a rear assembly which may integrate thrust reversal means and intended to surround the combustion chamber and all or part of the stages of the compressor and turbine of the turbojet engine, and is generally terminated by an ejection nozzle whose outlet is located downstream of the turbojet engine.

The mounting of a turbojet engine on an aircraft generally follows the following steps:

the bare turbojet engine is delivered by the motor manufacturer to the nacelle manufacturer who assembles the motor and its nacelle; and the motor equipped with its nacelle is delivered to the aircraft manufacturer who performs the mounting of the motor under the wing.

At each step of this process, the handling of the motor is a critical operation because the turbojet engines are very heavy parts and of very significant dimensions, but fragile. The motors are thus fastened to transport carriages ensuring maintaining the motor so as to prevent any damaging deformation thereof.

For the same reasons, hooking the motor under the wing is generally carried out by means of a lifting device allowing to raise the motor via, or with, the transport carriage thereof. The transport carriage is then removed once the motor is fastened to the wing. Such a device is known in particular from U.S. Pat. No. 6,485,247.

In a general manner, the precautions required to handle a turbojet engine are time-consuming and risk-generating. For example, when the bare motor is delivered to the nacelle manufacturer, it is necessary to separate the motor from its transport carriage to suspend it in height. Indeed, it is not possible to proceed with the assembly of the nacelle if the motor is fastened to its transport carriage because the latter prevents access to certain portions of the motor. Once the nacelle is assembled to the engine, the latter must be secured again to a transport carriage to be displaced to the assembly site of the aircraft manufacturer.

The invention object of the patent FR 3 021 954 B1 solves these disadvantages and provides a handling unit that allows ensuring at the same time the operations of the motor transport, the nacelle assembly and the hooking of the motor under the wing.

Such a handling unit includes:
a chassis;
four actuators, secured to the chassis and disposed in pairs facing one another, on either side of a longitudinal axis of the chassis; and
two connecting arms, elongated in a transverse direction of the chassis, and connecting each two of the actuators, each connecting arm including two devices for fastening the turbojet engine.

By providing four actuators connected in pairs by transverse connecting arms, the motor can be fastened directly to the handling unit, without the need for a cradle or a transport carriage. The handling unit thus allows lifting a motor to tie it up to the wing of an aircraft with the required maintain and rigidity. Furthermore, the handling unit allows performing all the assembly operations of the nacelle on the motor, due to the absence of elements preventing access to the motor. Finally, the transport can be ensured by leaving the motor secured to the handling machine, so that it can be used for all the steps of the motor mounting process, from the delivery of the bare motor by the motor manufacturer until the hooking under the wing. These steps are implemented while leaving the motor secured to the handling unit object of the invention.

However, the following disadvantages result from the handling unit that has just been described:

hydraulic leaks occur when the operator plugs and unplugs the hydraulic power unit on the chassis. These leaks are challenging for the operators, the chassis tends to drift due to the unevenness of the ground when the handling unit is mounted on air cushions. Maintaining the chassis in an immobile position requires the presence of many operators, increasing the human and material resources;

the presence of four actuators affects the accessibility for the operators to certain areas of the motor;

no information feedback on the force applied to the motor fasteners, causing a risk of mechanical breakdown.

Furthermore, the rotation of the motor mounted on the handling unit can be performed:

by elongating by a same stroke the two front actuators or the two rear actuators, so as to drive in rotation the motor about an axis substantially transverse to the chassis of the handling unit and passing through the ends of the two front or rear actuators, or by elongating by a same stroke the two actuators positioned along a same edge of the chassis of the handling unit, so as to drive in rotation the motor about an axis substantially parallel to a longitudinal axis of the chassis of the handling unit and passing through the ends of the two actuators of a same edge.

When a rotation of the motor is performed about an axis substantially parallel to a longitudinal axis of the chassis of the handling unit and passing through the ends of the two actuators of a same edge, the axis of rotation of the motor is eccentric relative to the longitudinal axis of the motor. This eccentric rotation causes poor accessibility to the motor for the operator(s).

SUMMARY

This section provides a general summary of the disclosure and is not a comprehensive disclosure of its full scope or all of its features.

The present disclosure provides a handling unit for an aircraft turbojet engine, comprising:

a chassis;

a front cradle positioned forward of said handling unit and a rear cradle positioned rearward of said handling unit, adapted to support the turbojet engine to be maintained, each of said cradles including two turbojet engine fastening devices; and a plurality of electric actuators, said handling unit being remarkable in that the plurality of electric actuators includes:

two electric actuators, disposed on either side of a longitudinal axis of the chassis, one of said two actuators being connected to the front cradle and arranged to displace said front cradle in vertical translation, the other of said two actuators being connected to the rear cradle and arranged to displace said rear cradle in vertical translation, or three electric actuators, including a first actuator and a second actuator disposed facing one another, on either side of a longitudinal axis of the chassis, connected to the front cradle and arranged to displace said front cradle in vertical translation, and including a third actuator connected to the rear cradle and arranged to displace said rear cradle in vertical translation; said handling unit being furthermore remarkable in that it includes a device for driving in rotation the front cradle about a longitudinal axis of said handling unit.

Thus, by providing a handling unit including only two or only three actuators, the accessibility to the turbojet engine is improved. The device for driving in rotation the front cradle about the axis of rotation of the motor allows driving in rotation the motor about its longitudinal axis, unlike the handling assemblies of the prior art where the rotation of the turbojet engine is eccentric relative to its longitudinal axis. The accessibility to the turbojet engine is thus improved relative to the prior art.

According to optional characteristics of the handling unit of the present disclosure:

each of said front and rear cradles includes:

a turbojet engine fastening arm, elongated in a transverse direction of the chassis, substantially semicircular, supporting the turbojet engine fastening devices, and a connecting arm, adapted to connect the fastening arm to the electric actuator(s);

and the rotational driving device includes:

a notched wheel, extending along the fastening arm of the front cradle, a pinion, engaged with said notched wheel, supported by the connecting arm, and a driving device for driving in rotation the pinion, the rear cradle includes a device for guiding in rotation said rear cradle about the longitudinal axis of the handling unit, each of said electric actuators is constituted by a screw-nut system adapted to drive said front and rear cradles in vertical translation;

the screw-nut system includes:

a screw, mounted on the chassis of the handling unit, a nut, engaged with said screw and secured to the connecting arm of the cradle, a driving device for driving in rotation said screw;

the chassis is equipped with devices allowing its displacement, such as wheels and air cushions;

the handling unit includes at least one device for stabilizing the chassis of the handling unit to the ground;

the stabilization device includes:

a stand made of elastomer material, and an actuator for actuating said stand, between a retracted position authorizing displacement of the handling unit relative to the ground, and a deployed position in which said stand abuts against the ground;

the stabilization device further includes an adjustment device for adjusting the chassis of the handling unit on the ground, adapted to authorize slight displacements in translation of said chassis on the ground in at least two directions of displacement;

the adjustment device for adjusting the chassis of the handling unit on the ground includes a set of balls arranged in the stand;

the handling unit includes a device for measuring the force of pressing the turbojet engine to the mast on which said turbojet engine is intended to be mounted;

the handling unit further includes a display for displaying the pressing force.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
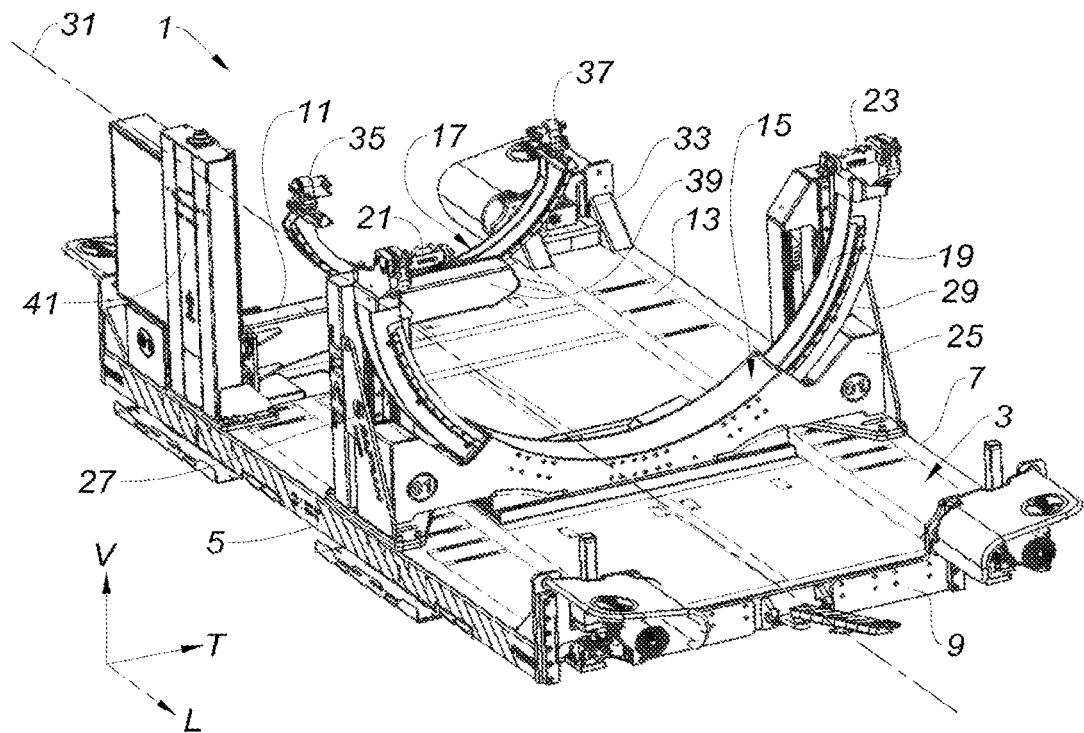
FIG. 1 is a front isometric view of the handling unit according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all the figures, identical or similar reference numerals represent identical or similar members or sets of members.

Moreover, in the description and the claims, to clarify the description and the claims, the terminology longitudinal, vertical and transverse will be adopted in a non-limiting manner with reference to the L, V, T direct trihedron indicated in the figures, whose longitudinal axis L is parallel to the longitudinal axis of the handling unit.

Referring to FIG. 1, the handling unit 1 of the present disclosure is shown.

The handling unit 1 includes a chassis 3, in the example having a generally rectangular shape, elongated in a longitudinal direction parallel to the axis L.

Figure 2:
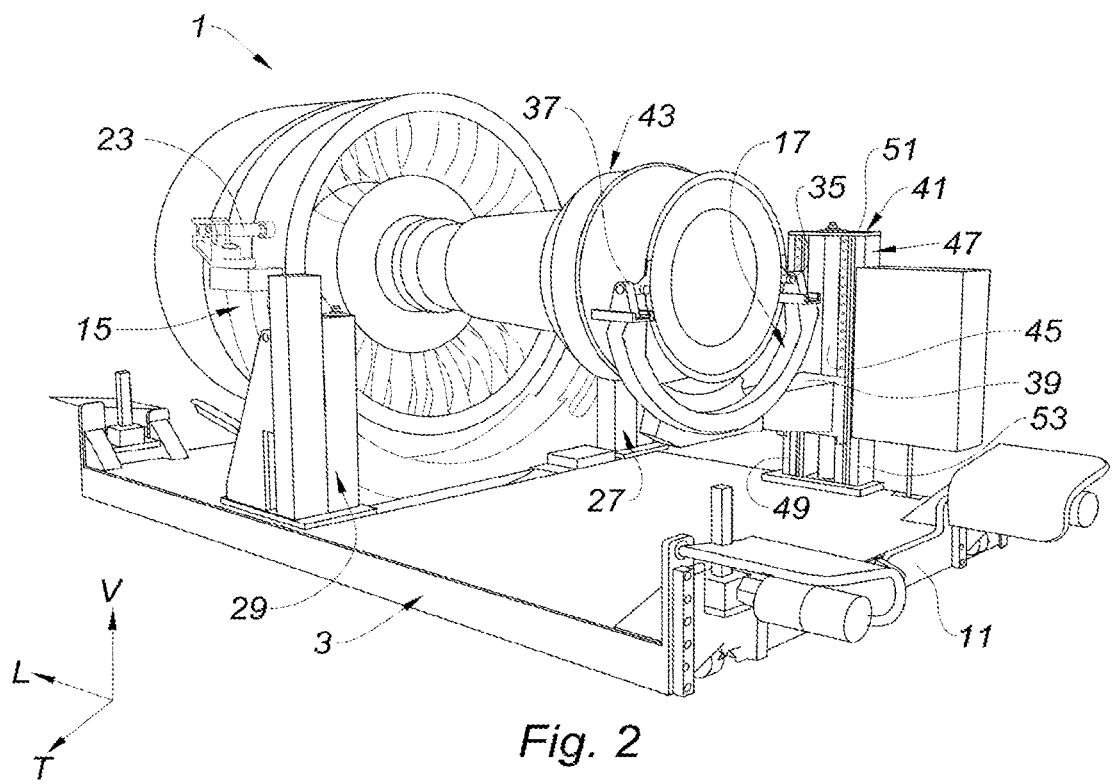
FIG. 2 is a rear isometric view of the handling unit of the present disclosure supporting a turbojet engine in a low position.

The chassis 3 includes in the example a frame formed of four spars: two lateral spars 5, 7, a front spar 9 and a rear spar 11 (best seen in FIG. 2). A floor 13 is made in the space delimited by these spars.

The handling unit 1 includes a front cradle 15 and a rear cradle 17, the front cradle being positioned forward of the handling unit and the rear cradle being positioned rearward of the handling unit.

The front cradle 15 includes a turbojet engine fastening arm 19, having a substantially semicircular shape, extending substantially along the axis T transverse to the axis L of the chassis 3.

The fastening arm 19 supports two turbojet engine fastening devices 21, 23, on which is fastened the fan casing of the turbojet engine (visible in FIG. 2).

The front cradle 15 further includes a connecting arm 25, adapted to connect the fastening arm 19 of the front cradle to two electric actuators 27, 29 disposed on either side of a longitudinal axis 31 of the chassis 3.

The electric actuator 27 is positioned close to the right and to the front of the handling unit 1, while the electric actuator 29 is positioned close to the left and to the front of the handling unit 1.

The rear cradle 17 also includes a turbojet engine fastening arm 33, having a substantially semicircular shape, extending substantially along the axis T transverse to the axis L of the chassis 3.

The fastening arm 33 supports two turbojet engine fastening devices 35, 37, on which is fastened a downstream portion of the turbojet engine, the low-pressure turbine for example (visible in FIG. 2).

The rear cradle 17 further includes a connecting arm 39, adapted to connect the fastening arm 33 of the rear cradle to a single electric actuator 41, disposed rearward of the chassis 3. The electric actuator 41 is positioned close to the right and to the rear of the handling unit 1.

According to the present disclosure, the electric actuator 27 (front-right) and the electric actuator 29 (front-left) are disposed facing one another, on either side of the longitudinal axis 31 of the chassis 3 of the unit 1.

The electric actuator 41 is positioned close to the right and to the rear of the handling unit 1. Note that according to one form, the electric actuator 41 can be positioned close to the left and to the rear of the handling unit.

According to another form not specifically illustrated, the handling unit 1 includes only two electric actuators which are disposed on either side of the longitudinal axis 31 of the chassis 3. The first electric actuator is connected to the front cradle and the second electric actuator is connected to the rear cradle.

Figure 3:
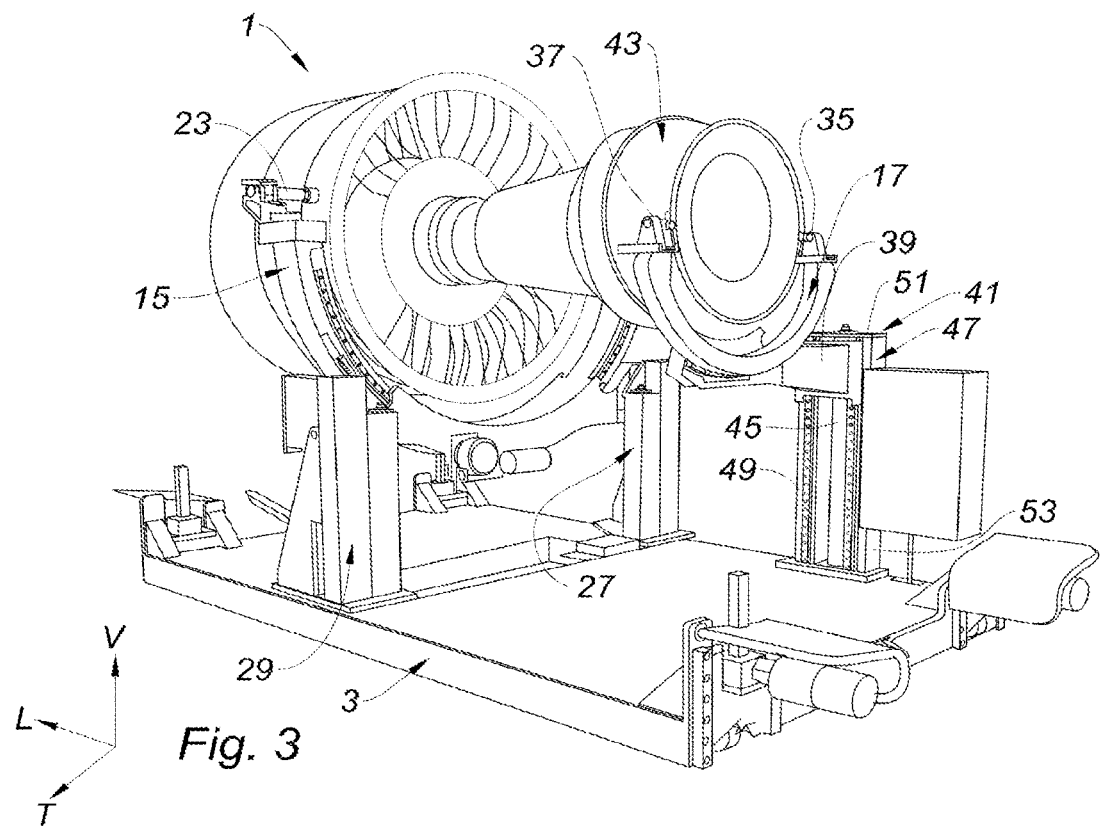
FIG. 3 is a rear isometric view of the handling unit in a high position according to the present disclosure.

Referring to FIGS. 2 and 3 which show the handling unit in a rear isometric view, supporting a turbojet engine 43, respectively in a low position (FIG. 2) and in a high position (FIG. 3).

The switching between the low and high positions is obtained by activating each electric actuator 27, 29, 41.

Regardless of the number (two or three) of electric actuators retained to equip the handling unit, each actuator is arranged to displace in vertical translation the cradle to which it is connected.

The electric actuators 27, 29 are thus arranged to displace only the front cradle 15 only in the vertical direction, while the electric actuator 41 is arranged to displace only the rear cradle 17 only in the vertical direction.

To this end, each electric actuator is obtained by a screw-nut system. The screw-nut system constituting the rear-right electric actuator 41 is shown in FIGS. 2 and 3.

Such a screw-nut system includes, in a manner known to those skilled in the art, a screw 45, mounted on the chassis 3 of the handling unit and a nut (not shown), engaging with the screw 45 and secured the connecting arm 39 of the rear cradle 17. The screw is driven in rotation about its longitudinal axis by a rotational driving device such as an electric motor. The screw 45 is protected by a casing 47 comprising three metal sheets 49, 51, 53 arranged so as to allow the nut of the connecting arm 39 to be engaged with the screw 45. The rotation of the screw 45 causes the translation of the nut secured to the connecting arm, along the screw 45, allowing to switch between a low (respectively high) position and a high (respectively low) position. The screw-nut system may include a brake, in case of breakage of the power line.

The screw-nut systems constituting the front-right 27 and front-left 29 electric actuators are identical in design to that of the rear-right electric actuator 41.

As shown in FIGS. 2 and 3, the front electric actuators 27, 29 and the rear electric actuator 41 are synchronized so as to cause the turbojet engine 43 to displace horizontally, along the vertical axis V. The fact of using a set of electric actuators rather than pneumatic or hydraulic actuators allows a better synchronization of the displacement of the front and rear cradles.

According to an arrangement of the present disclosure, the handling unit includes a device for measuring the force of pressing the turbojet engine to the mast on which the turbojet engine is intended to be mounted. This device allows measuring the force applied on each of the electric actuators, and may for example include a force washer that is placed at the base of the actuators in order to identify the load transfer. The measurement of the pressing force can advantageously be displayed in real time on a display equipping the handling unit of the present disclosure, so that an operator can adjust, in real-time, the force that he applies to press the turbojet engine to the mast.

According to an arrangement not shown in the figures, the front electric actuators 27, 29 and the rear electric actuator 41 may be desynchronized, so as to cause a displacement of one of the front or rear cradles by a stroke different from the other of the front or rear cradles.

Such a desynchronization causes a rotation of the turbojet engine 43 about an axis parallel to the transverse axis T and passing through the devices 21, 23 (only the fastening device 23 is visible in FIGS. 2 and 3) for fastening the turbojet engine to the front cradle 15, or a rotation of the turbojet engine about an axis parallel to the transverse axis T and passing through the devices 35, 37 for fastening the turbojet engine to the rear cradle 17. This arrangement allows to pitch up the turbojet engine, this being useful due to the hooking angle of the turbojet engine on the mast, which is substantially equal to $-2.2°$. It is typically considered to be able to reach a pitch angle of the turbojet engine comprised between about $+/-7°$ and $+/-10°$ relative to an axis parallel to the transverse axis T.

Figure 4:
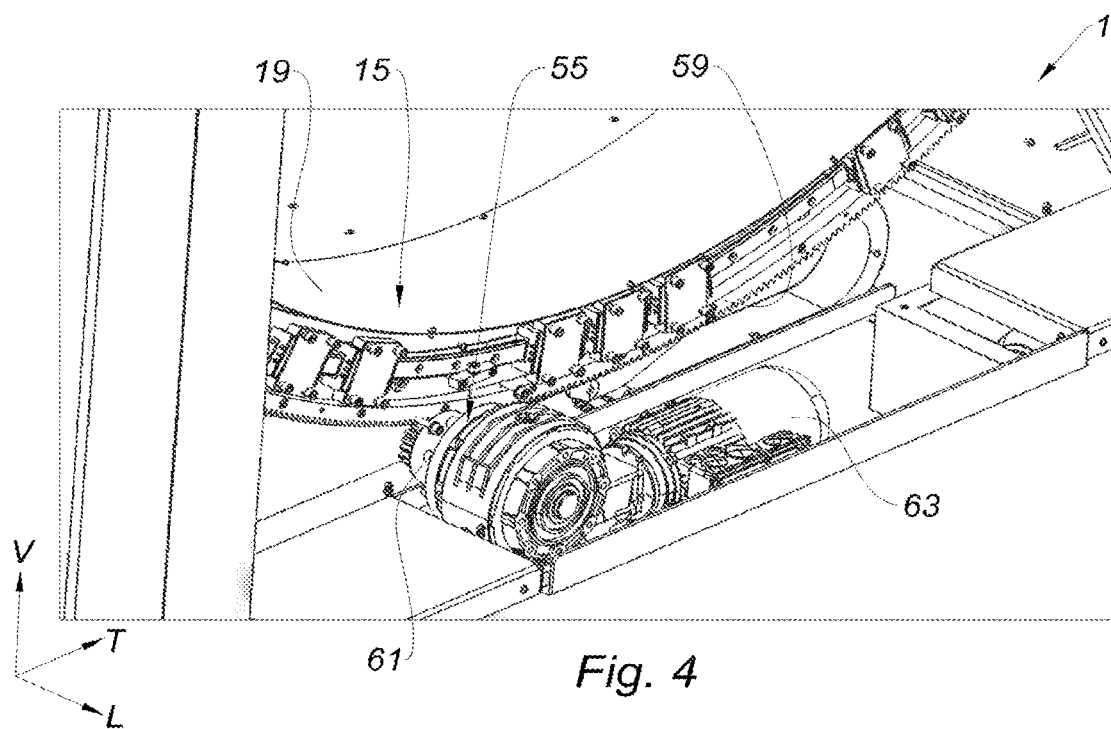
FIG. 4 is an enlarged view illustrating the driving device for driving in rotation the front cradle according to the present disclosure.
Figure 5:
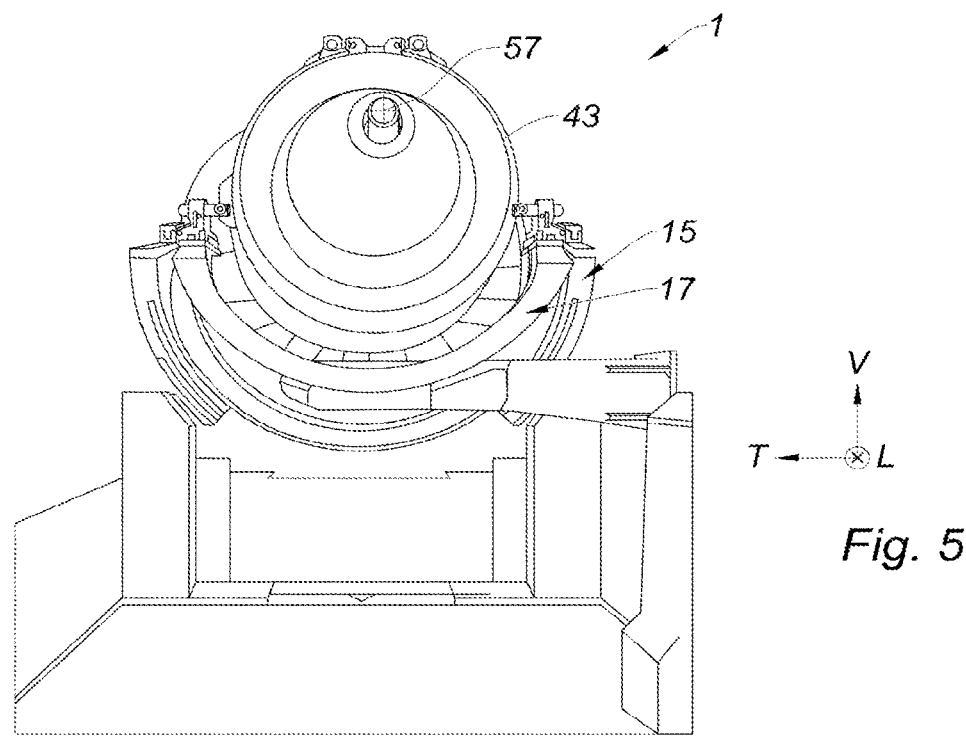
FIG. 5 is a rear view of the handling unit supporting a turbojet engine, in a high position according to the present disclosure.
Figure 6:
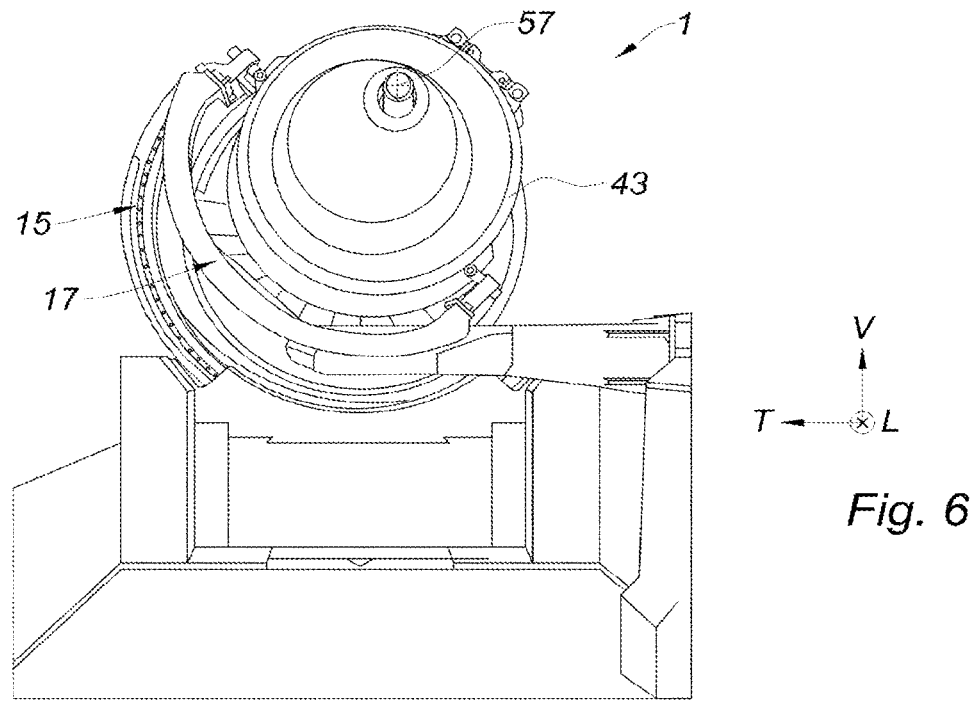
FIG. 6 is a rear view of the handling unit supporting a turbojet engine, in a high position, in a position of rotation of the turbojet engine about its longitudinal axis according to the present disclosure.

Referring now to FIGS. 4 to 6. According to the present disclosure, the handling unit 1 is equipped with a device for driving in rotation 55 the front cradle 15 about a longitudinal axis 57 (visible in FIGS. 5 and 6) of the handling unit. The longitudinal axis 57 corresponds to an axis substantially parallel to the axis L of the trihedron and passing through the center of the virtual circle defined by the front cradle 15. The longitudinal axis 57 is, in other words, coincident with the longitudinal axis of the turbojet engine 43 when the latter is mounted on the handling unit 1 and supported by the handling unit in the horizontal position, as visible in FIGS. 5 and 6.

With reference to FIG. 4, showing a view of the handling unit 1 centered on the device for driving in rotation 55 the front cradle 15, this rotational driving device 55 includes a notched wheel 59 which extends along the fastening arm 19 of the front cradle 15. The notched wheel 59 engages with a pinion 61 supported by the connecting arm 25 of the front cradle 15. The rotation of the pinion 61 is controlled by a rotational driving device such as an electric motor 63, that can be supported by the connecting arm 25 (not shown for a better visibility) of the front cradle 15.

Referring to FIG. 5 in which the handling unit 1 supporting the turbojet engine 43 in the high position is shown in a rear view, the front cradle 15 has not yet been driven in rotation about the longitudinal axis 57 of the turbojet engine.

When the pinion 61 is driven in rotation by the electric motor, the teeth of the pinion drive in rotation the notched wheel 59 secured to the fastening arm 19 of the front cradle 15. The turbojet engine, fastened on the front cradle 15 via the fastening devices 21, 23, is jointly driven in rotation about its longitudinal axis 57, for example to reach the position shown in FIG. 6 illustrating in a rear view the handling unit 1 supporting the turbojet engine 43 in the high position, the front cradle 15 having been driven in rotation about the longitudinal axis 57 of the turbojet engine.

The rear cradle 17, in turn, includes a movement follower device. This device typically includes a device for guiding in rotation the rear cradle 17 about the longitudinal axis 57 of the handling unit, such as a guide on ball bearings.

Alternatively, the handling unit may be equipped with a device for driving in rotation the rear cradle, in accordance with the one that has just been described for the front cradle, in addition to the device for driving in rotation the front cradle.

Alternatively, only the rear cradle can be equipped with a device for driving in rotation the rear cradle, in accordance with the one that has just been described for the front cradle, and the front cradle can include a movement follower device.

Unlike the handling assemblies of the prior art where a rotation of the turbojet engine is obtained by elongating by a same stroke the two actuators positioned along a same edge of the chassis of the handling unit, thanks to the device of the present disclosure there is obtained a rotation of the turbojet engine about its longitudinal axis and not about an axis substantially parallel to a longitudinal axis of the chassis of the handling unit and passing through the ends of the two actuators of a same edge.

This allows improving the accessibility to the turbojet engine relative to the prior art, in that the rotation of the turbojet engine is operated about the longitudinal axis thereof. The rotation of the turbojet engine is thus no longer eccentric relative to its longitudinal axis, as is the case in the prior art. In addition, the rotational driving device is adapted to drive in rotation the respective cradle only about the longitudinal axis of the turbojet engine.

Figure 7:
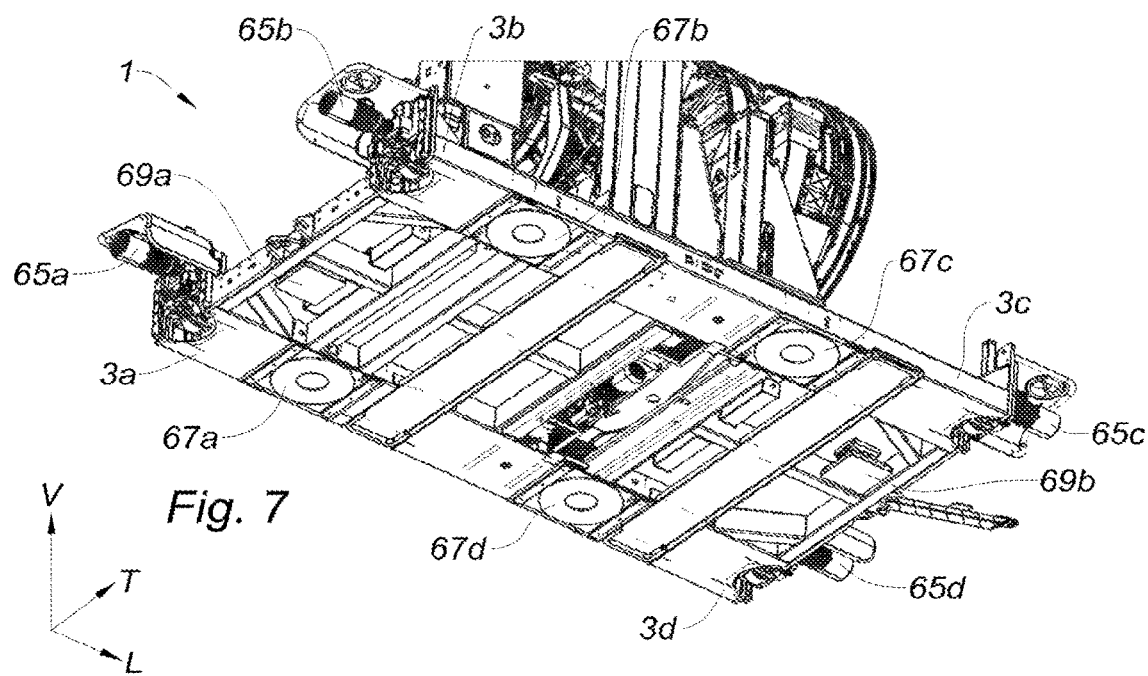
FIG. 7 is a bottom isometric view of the handling unit according to the present disclosure.

Referring now to FIG. 7 showing the handling unit 1 in a bottom isometric view.

The chassis 3 of the unit 1 is equipped with devices allowing its displacement. The devices allowing the displacement of the handling unit is stowed or deactivated during the phases in which the handling unit 1 is immobile and bearing on the ground (that is to say all the phases during which the turbojet engine is not desired to be displaced).

To this end, these displacement devices include wheels (not shown) mounted on axles 65a, 65b, 65c, 65d positioned at corners 3a, 3b, 3c, 3d of the chassis 3.

The wheels allow displacement of the handling unit over medium distances (between workshops) or over long distances. In this second case, the wheels are larger in diameter than that of the wheels used in the case of medium distance displacements.

The handling unit 1 displacement devices also include air cushions 67a, 67b, 67c, 67d, allowing to detach the handling unit from the ground and then to displace it over short distances. This allows for example displacing by a few centimeters the handling unit when it is under the mast to which the turbojet engine is attached.

According to the present disclosure, two devices for stabilizing 69a, 69b the chassis 3 on the ground equip the handling unit. Alternatively, the handling unit may include a single device for stabilizing the chassis on the ground, or more than two stabilization devices.

Figure 8:
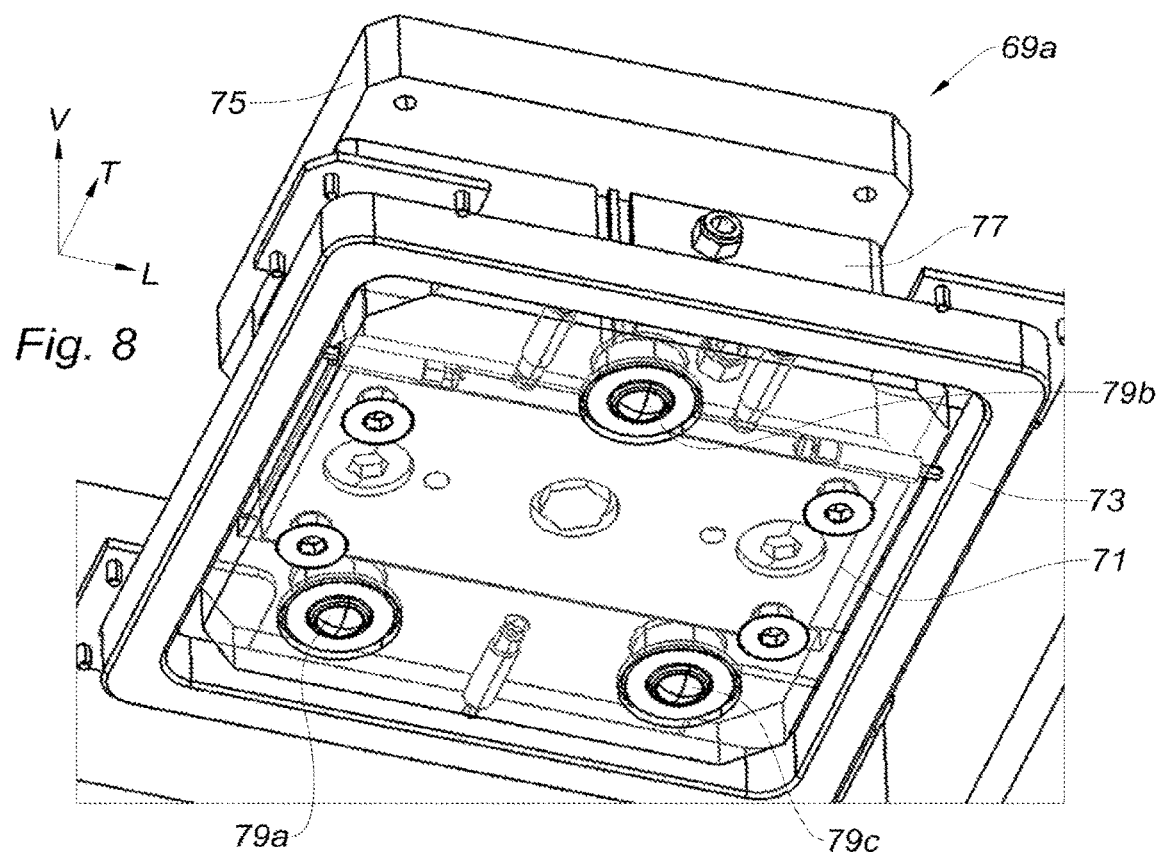
FIG. 8 is a bottom isometric view of one form of the stabilization device which is a detail view of a device for stabilizing the chassis of the handling unit to the ground according to the present disclosure.

Referring to FIG. 8 which shows one form of the stabilization device 69a in a bottom isometric view, the form of the stabilization device 69b is in accordance with that of the stabilization device 69a.

The stabilization device 69a includes a stand 71, made of elastomer material. The stand, having a generally rectangular shape, is housed in a lower frame 73 of the stabilization device. The stabilization device includes an upper plate 75 which interfaces with the chassis of the handling unit.

The stand 71 can be actuated at will via cylinders, for example pneumatic cylinders, forming a means for actuating said stand. The cylinders (not shown) are housed in a casing 77 positioned between the upper plate 75 and the lower frame 73 of the stabilization device 69a.

The stand 71 is movable, during the activation of the cylinders, between a retracted position authorizing the displacement of the handling unit relative to the ground and a deployed position in which said stand abuts against the ground.

The contact of the elastomer material of the stand with the ground inhibits inadvertent displacement of the handling unit relative to the ground. However, in order to allow slight displacements of the handling unit along the axes L and T, the stabilization device 69a includes an adjustment device for adjusting the chassis of the handling unit on the ground, adapted to authorize slight displacements in translation of the chassis on the ground.

The adjustment device for adjusting the chassis of the handling unit on the ground includes a set of balls 79a, 79b, 79c arranged in the stand.

It goes without saying that the present disclosure is not limited to the sole forms of the handling unit, described above only by way of illustrative examples, but on the contrary, embraces all the variants involving the technical equivalents of the described means as well as their combinations if the latter fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handling unit for an aircraft turbojet engine comprising:
   a chassis;
   a front cradle positioned forward of the handling unit and a rear cradle positioned rearward of the handling unit, adapted to support the aircraft turbojet engine to be maintained, each of the cradles including two fastening devices for fastening the aircraft turbojet engine;
   a plurality of electric actuators, wherein the plurality of electric actuators includes:
     two electric actuators disposed on either side of a longitudinal axis of the chassis, wherein one of the two electric actuators is connected to the front cradle and arranged to displace the front cradle in vertical translation, and the other of the two actuators is connected to the rear cradle and arranged to displace the rear cradle in vertical translation, or
     three electric actuators including a first actuator and a second actuator facing one another, on either side of a longitudinal axis of the chassis, connected to the front cradle and arranged to displace the front cradle in vertical translation, and including a third actuator connected to the rear cradle and arranged to displace the rear cradle in vertical translation; and
   wherein the handling unit further comprises a rotational driving device for driving in rotation the front cradle only about a longitudinal axis of the handling unit.

2. The handling unit according to claim 1, wherein each of the front cradle and the rear cradle includes:
   a fastening arm for fastening the aircraft turbojet engine, elongated in a transverse direction of the chassis, substantially semicircular, supporting the aircraft turbojet engine fastening devices; and
   a connecting arm adapted to connect the fastening arm to the electric actuators,
   and wherein the rotational driving device includes:
   a notched wheel extending along the fastening arm of the front cradle;
   a pinion, engaged with the notched wheel and supported by the connecting arm; and
   an actuator for driving the pinion in rotation.

3. The handling unit according to claim 1, wherein the plurality of electric actuators comprise a screw-nut system adapted to drive the front cradle and the rear cradle in vertical translation.

4. The handling unit according to claim 3, wherein the screw-nut system includes:
   a screw mounted on the chassis;
   a nut engaged with the screw and secured to a connecting arm of the front cradle or the rear cradle; and
   an actuator for driving the screw in rotation.

5. The handling unit according to claim 1, wherein the chassis is equipped with wheels and air cushions configured to allow the displacement of the chassis.

6. The handling unit according to claim 5, wherein the chassis includes at least one stabilization device.

7. The handling unit according to claim 6,
   wherein the at least one stabilization device includes:
   a stand made of elastomer material; and
   an actuator for actuating the stand between a retracted position authorizing displacement of the handling unit relative to a ground and a deployed position in which the stand abuts the ground.

8. The handling unit according to claim 7, wherein the at least one stabilization device further includes an adjustment device adapted to allow displacements in translation of the chassis on the ground in at least two directions of displacement.

9. The handling unit according to claim 8, wherein the adjustment device includes a set of balls arranged in the stand.

10. The handling unit according to claim 1, wherein the plurality of actuators include no more than three actuators for displacing the front cradle and the rear cradle in vertical translation.

11. The handling unit of claim 10, wherein the plurality of electric actuators include only two electric actuators.

12. The handling unit of claim 10, wherein the plurality of electric actuators include only three electric actuators.

13. The handling unit of claim 12, wherein in a case where the plurality of electric actuators include three electric actuators, the first actuator and the second actuator are arranged to displace only the front cradle only in the vertical translation, and the third actuator is arranged to displace only the rear cradle only in the vertical translation.

14. The handling unit of claim 1, wherein only the rear cradle or only the front cradle is equipped with the rotational driving device.

15. The handling unit of claim 1, wherein:
   in a case where the plurality of electric actuators include two electric actuators, the one of the two electric actuators is arranged to displace the front cradle only in the vertical translation, and the other of the two actuators is arranged to displace the rear cradle only in the vertical translation, and
   in a case where the plurality of electric actuators include three electric actuators, the first actuator and the second actuator are arranged to displace the front cradle only in the vertical translation, and the third actuator is arranged to displace the rear cradle only in the vertical translation.

16. The handling unit of claim 1, wherein:
   in a case where the plurality of electric actuators include two electric actuators, the other of the two actuators is the only actuator of the plurality of electric actuators connected to the rear cradle; and
   in a case where the plurality of electric actuators include three electric actuators, the third actuator is the only electric actuator of the plurality of electric actuators connected to the rear cradle.

17. The handling unit of claim 1, wherein the rotational driving device is a separate device from the plurality of electric actuators and controls rotation of the front cradle independently of the plurality of electric actuators.

18. A handling unit for an aircraft turbojet engine, comprising:
   a chassis;
   a front cradle positioned forward of said handling unit and a rear cradle positioned rearward of said handling unit, adapted to support the aircraft turbojet engine to be maintained, each of the cradles including two fastening devices for fastening the aircraft turbojet engine;
a plurality of electric actuators,
wherein the plurality of electric actuators includes:
two electric actuators,
disposed on either side of a longitudinal axis of the chassis,
wherein one of the two actuators is connected to the front cradle and arranged to displace the front cradle in vertical translation, and
the other of said two actuators is connected to the rear cradle and arranged to displace said rear cradle in vertical translation, or
three electric actuators including a first actuator and a second actuator facing one another, on either side of a longitudinal axis of the chassis,
connected to the front cradle and arranged to displace the front cradle in vertical translation, and including a third actuator connected to the rear cradle and arranged to displace the rear cradle in vertical translation; and
a rotational driving device for driving in rotation the front cradle about a longitudinal axis of the handling unit;
wherein the chassis is equipped with wheels and air cushions configured to allow the displacement of the chassis;
wherein the chassis includes at least one stabilization device;
wherein the stabilization device includes:
a stand made of elastomer material, and
an actuator for actuating said stand,
between a retracted position authorizing displacement of the handling unit relative to a ground, and
a deployed position in which said stand abuts against the ground;
wherein the at least one stabilization device further includes an adjustment device adapted to allow displacements in translation of the chassis on the ground in at least two directions of displacement;
wherein the adjustment device includes a set of balls arranged in the stand.

19. A handling unit for an aircraft turbojet engine comprising:
a chassis;
a front cradle positioned forward of the handling unit and a rear cradle positioned rearward of the handling unit, adapted to support the aircraft turbojet engine to be maintained, each of the cradles including two fastening devices for fastening the aircraft turbojet engine;
a plurality of electric actuators, wherein the plurality of electric actuators include:
two electric actuators disposed on either side of a longitudinal axis of the chassis, wherein one of the two electric actuators is connected to the front cradle and arranged to displace only the front cradle only in vertical translation, and the other of the two actuators is connected to the rear cradle and arranged to displace only the rear cradle only in vertical translation, or
three electric actuators including a first actuator and a second actuator facing one another, on either side of a longitudinal axis of the chassis, connected to the front cradle and arranged to displace the front cradle in vertical translation, and including a third actuator connected to the rear cradle and arranged to displace the rear cradle in vertical translation; and
wherein the handling unit further comprises a rotational driving device for driving in rotation the front cradle about a longitudinal axis of the handling unit.

* * * * *